3,491,822
SEA WATER DESALINATION
Devabhaktuni Ramaswami, Hinsdale, and Albert A. Jonke, Elmhurst, Ill., assignors to the United States of America as represented by the United States Atomic Energy Commission
Filed Mar. 15, 1968, Ser. No. 713,406
Int. Cl. B01d 1/02, 1/14, 1/18
U.S. Cl. 159—48            3 Claims

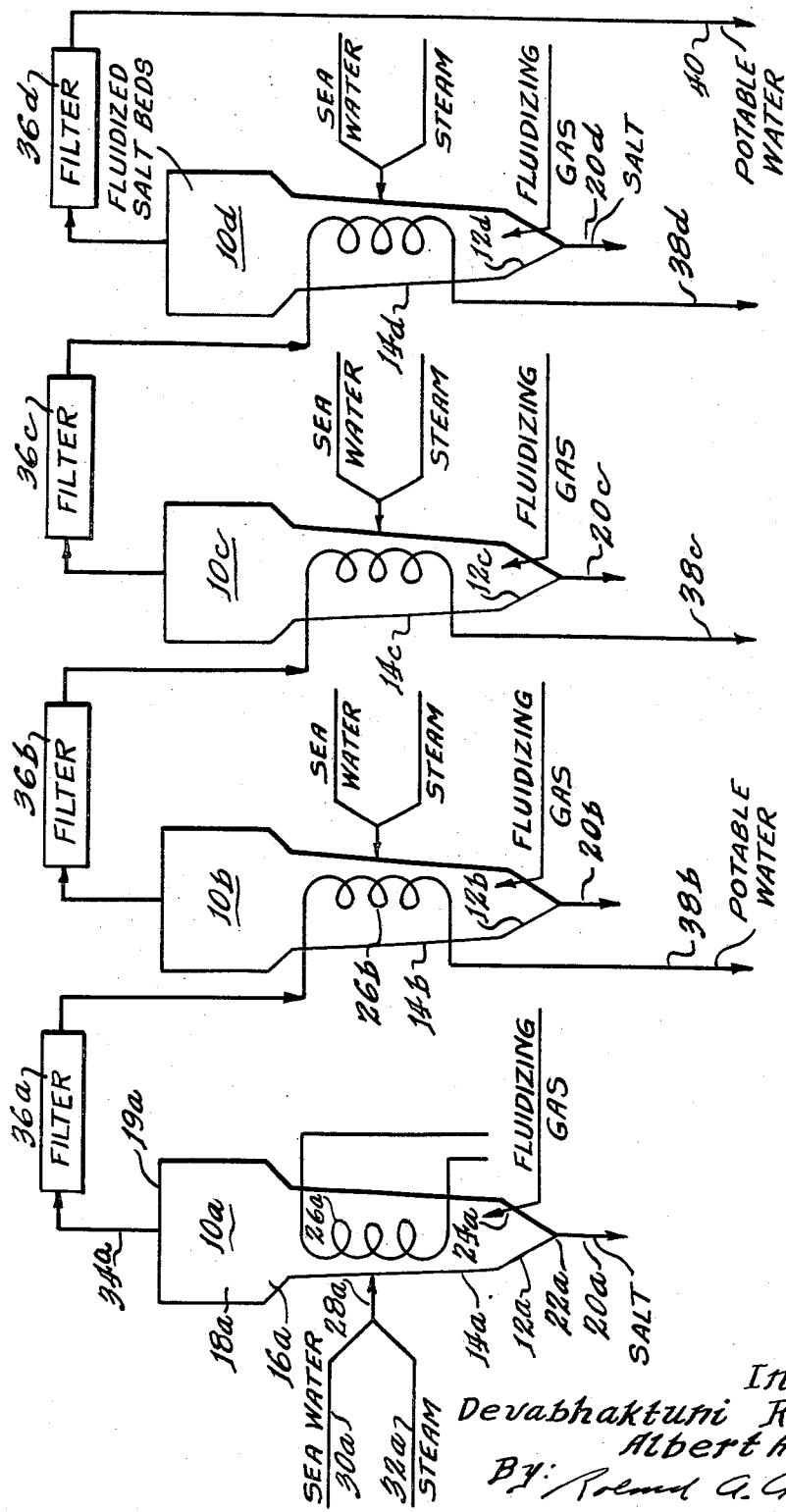

ABSTRACT OF THE DISCLOSURE

Atomized sea water is sprayed into a fluidized bed of salt particles. Evaporation of fresh water from the surface of the salt particles leaves solid salt in the bed but no brine. Multiple beds may be used.

Contractual origin of the invention

The invention described herein was made in the course of, or under, a contract with the United States Atomic Energy Commission.

Background of the invention

This invention relates to the desalination of sea water and more particularly to desalination in a fluidized bed.

There are several methods now being investigated for economically producing fresh water from sea water. Freezing, reverse osmosis, distillation and flash evaporation are some of the methods being investigated. Of the four, distillation has received the most attention. Generally in distillation, heat is transferred through a plurality of tubes to sea water surrounding the tubes. Fresh water evaporates from the surface of the tubes and is collected as steam. The presence of a continuous liquid phase and evaporation from the tube surfaces causes several difficulties.

Sea water has a significant mineral content which collects as scale on the tube surfaces. Scale decreases heat transfer through the tubes and may cause corrosion. In distillation, as fresh water is removed from the sea water a concentrated brine solution is produced which is corrosive and therefore harmful to the equipment. The brine is also a pollutant and its disposal is costly.

Besides the aforementioned scaling, corrosion and pollution, in distillation the fresh-water-production capacity is dependent upon the vapor velocity of the steam as it moves through the system. Vapor velocity is dependent upon the heat-transfer area which is determined by the number and size of the tubes. Increasing the vapor velocity is difficult because the number and size of the tubes are not readily changed. In addition to the fixed and relatively low vapor velocity in distillation, the heating medium inside the tubes is restricted to a comparatively low temperature. A liquid film is formed on the tube wall during evaporation, and the film as well as other factors decrease heat transfer and prevent the sea water from reaching thermal equilibrium with the heating medium. A temperature gradient is established across the tube walls which produces a thermal stress related to the temperature of the heating medium. To maintain the temperature gradient and therefore the thermal stress within acceptable bounds, the heating medium is restricted to comparatively low temperatures. Low-value steam of about 40 to 50 p.s.i. is commonly used.

The process of this invention avoids or lessens many of the above-enumerated disadvantages by evaporating the sea water from a fluidized bed. Atomized sea water constituting only a small percentage (less than 20% and usually about 10%) of the bed weight is sprayed into the bed. Because the percentage of water in the system at any one time is small, a continuous liquid phase is not present. Although the fluidized bed is heated by heat exchange through tubes as in distillation, the fluidized bed and the heating medium in the tubes are essentially in thermal equilibrium so there is little if any temperature gradient across the tube walls. Evaporation of sea water is primarily from the bed particles but whatever scale is deposited on the tube walls, by evaporation therefrom, is removed by the abrasive action of the bed particles in contact with the tube walls. Less scale on the tube walls results in less corrosion and better heat transfer to the bed.

An important aspect of this invention is that the bed particles are the primary heating medium for the sea water; therefore, the total surface area of the heating medium can be controlled by varying the particle and bed size. Larger surface areas mean increased vapor velocities and greater fresh-water-production capacity. Because increasing the temperature of the heating medium does not increase the temperature gradient across the tube walls, a much wider choice of heating media is available for use in a fluidized bed. For instance, the heating medium can be low-value steam at 40 p.s.i. or steam at 250 p.s.i. or the sodium-potassium coolant from a breeder reactor. This versatility is particularly advantageous when a desalination plant is combination with a nuclear power plant and the heating medium for the desalination plant is high-value steam taken from turbine generators.

Added to the advantages described above, evaporation of sea water from a fluidized bed gives rise to another bonus. Since the evaporation takes place on the bed particles, all the sea water can be evaporated and solid salt produced which can be recovered from the bed. No brine is present to cause corrosion and pollution, because all the sea water is converted to fresh water. A final advantage over distillation is that less sea water is used to produce a unit amount of fresh water.

This invention may be better understood by reference to the following drawing and examples.

Brief description of the drawings

The single drawing is a schematic for the practice of this invention.

A series of fluidized-bed reactors 10a, 10b, 10c, 10d are used in the practice of this invention, but for the sake of clarity only one reactor will be described where possible. Reactor 10a is composed of a conical bottom section 12a connected to a tapered cylindrical fluidizing section 14a having an increasing diameter. A frustoconical transition section 16a is intermediate tapered cylindrical fluidizing section 14a and a large-diameter cylindrical disengaging section 18a. Reactor 10a is covered by a top 19a. A solid-product outlet 20a is located at apex 22a of conical bottom section 12a and a fluidizing-gas inlet 24a is located near the apex of the conical bottom section. A heat exchanger 26a is located within tapered cylindrical fluidizing section 14a. A sea-water inlet 28a is connected to a sea-water source 30a and a steam source 32a and enters reactor 10a at the tapered cylindrical fluidizing section 14a. A steam outlet 34a leads from the top 19a of reactor 10a through a filter 36a to heat exchanger 26b in reactor 10b. A fresh-water outlet 38b leads from heat exchanger 26b, and a fresh-water outlet 40 is connected to filter 36d.

In operation, a fluidized bed is established in the tapered cylindrical fluidizing section 14 of reactor 10 by passing a fluidizing gas into the reactor through inlet 24. The bed may be composed of many materials such as sand, alumina, salt or combinations thereof, but salt is preferred. Since salt is produced during the process, it may be easily recovered if the bed is initially composed of salt. The fluidizing gas may be air, steam or other gases, but steam is preferred because it is a condensable gas. The bed is heated by passing a heating medium through heat exchanger 26 and, as stated before, there is a great variety of heating media which may be used. Sea water is atomized and sprayed into the bed through inlet 28. While sea water may be atomized and sprayed into the bed by itself, a two-phase system of sea water and steam produces a better atomization of the sea water and is preferred for large-diameter beds. A plurality of inlets 28 may be used on any one reactor 10 to obtain an even distribution of atomized sea water in the bed. The sea water sprayed into the bed slightly wets the bed particles and then evaporates from the surface of the particles. When the sea water evaporates, solid salt is left behind, which may be recovered for further treatment or sale.

Since there is no continuous liquid phase in reactor 10, the problems related to scaling, corrosion and pollution are mostly avoided. The water which evaporates from the bed particles is fresh water and is conducted through steam outlet 34 to filter 36 where any bed particles carried by the steam are removed. Steam from filter 36 passes to the next heat exchanger 26 in the series of reactors 10. When the steam has passed through heat exchanger 26, it is collected through fresh-water outlet 38. The last filter 36 connected to the last in the series of reactors 10 is provided with fresh-water outlet 40.

The reactors 10 are tapered with the larger diameter at the top in order to provide constant pressure in the reactor as steam rises therethrough. As steam rises upwardly through reactor 10 the production of steam from the bed and the decrease in pressure head would normally result in an increased pressure. The increasing diameter of tapered section 14 maintains a more even pressure throughout reactor 10. The number of reactors 10 in the series is dependent upon economics and the type of heating medium available.

Several experiments have been conducted to show the feasibility of fluid-bed evaporation of sea water. The experiments were conducted in a 6-inch-diameter fluidized bed, which was provided with external electrical heaters. Hence, a large heat-transfer area was not available. Because the heat-transfer area was small, the evaporation rates were correspondingly low. In a production reactor, the fluidized beds would be on the order of 20 feet in diameter and 20 feet in height, so the heat-transfer area would be quite large. The beds consisted of sand or salt and were fluidized by either steam or air. Sea water was sprayed into the beds alone and in combination with air. In a production reactor, steam would be preferable to air, because it is condensable. The data collected from these experiments are presented in Table I:

The first three experiments are not reported in Table I but were similar to runs 4–7. The beds were sand and were fluidized with either air or steam. No agglomeration occurred. After the experiments were terminated in runs 4, 5 and 7, the final beds were screened to determine the particle-size distribution. The screen analysis is presented in Table II:

TABLE II.—SCREEN ANALYSIS OF STARTING AND FINAL SODIUM CHLORIDE BEDS

| Retained On— | Typical Starting Bed, Percent | Final Beds | | |
|---|---|---|---|---|
| | | Run-4 | Run-5 | Run-7 |
| 40 mesh | 42.0 | 19.5 | 7.7 | 30.1 |
| 60 | 13.3 | 22.0 | 6.3 | 14.0 |
| 80 | 13.1 | 19.9 | 10.7 | 13.7 |
| 120 | 17.0 | 22.1 | 17.6 | 18.6 |
| 170 | 10.0 | 15.1 | 17.8 | 13.0 |
| 200 | 1.2 | 1.2 | 3.7 | 1.9 |
| Pan | 3.0 | 0.3 | 26.1 | 9.1 |

It may be seen by reference to the tables that the runs through run 8 were isothermal, while the runs from 9 through 20 were not. Beginning with run 9, equilibrium conditions were established at around 200° C. Then, the temperature was permitted to slowly decrease. Wall and bed temperatures were recorded for abnormal patterns, and the bed fluidization characteristics were monitored through both the temperature patterns and pressure measurements. In normal operation, the temperature difference between the reactor wall and the fluidized bed was reasonably constant. The first indication of bed wetting was usually an increase in this temperature difference. A second indication of bed wetting was a disparity in temperature between the top and bottom of the bed, and a third indication of bed wetting was a loss of fluidization.

The best atomization of the sea water was produced at intermediate feed rates of about 38 milliliters per minute. This feed rate also produced the fewest amounts of fines of any of the runs. The beds did not agglomerate during any of the runs, so the heat transfer characteristics were not degraded.

A 1.1 million gallon per day (m.g.p.d.) desalination plant using four fluidized beds may be taken as a production example. The fluidized beds would be 20 feet in diameter and 20 feet high. Each reactor vessel would have a total heat-transfer area of 17,600 square feet or 3,520 tubes, each one inch in diameter by 20 feet long. The heat-transfer tubes would occupy about 7% of the vessel volume. The steam vapor velocity for this system would be about 2.5 ft./sec.

If the heating medium in the first reactor were low pressure steam from a generator at about 39 p.s.i.a., then the first fluidized bed temperature would be about 265° F. The steam evaporating from the first bed would be about 230° F.; the steam from the second bed would be about 193° F.; the steam from the third bed would be about TABLE I
Starting fluid bed: NaCl. Fluidizing gas: Steam. Liquid feed: Sea water, except as noted.

| Run No. | Bed Temp. Range, °C. | Run Time, Hrs. | Initl. Bed Wt., Kg. | Steam Rate, ft./sec. | Feed Rate, Ml./Min. | Percent Fines Final Bed | Comments |
|---|---|---|---|---|---|---|---|
| 4[1] | 200 | 6.0 | 7.0 | [2]1.1 | 13.3 | | |
| 5[1] | 200 | 5.0 | 7.0 | 2.3 | 22.7 | | Terminated prematurely due to operating difficulties. |
| 6[1] | 200 | 3.0 | 7.0 | 2.3 | 26.0 | | Do. |
| 7[1] | 200 | 6.0 | 7.0 | 2.3 | 22.2 | | |
| 8[1] | 200 | 5.0 | 7.0 | 2.2 | 33.0 | | Large quantities of fines. |
| 9[1] | 200–172 | 6.0 | 7.0 | 2.0 | 35.0 | 9.7 | No apparent wetting tendencies. |
| 10[1] | 192–154 | 6.0 | 7.0 | 2.1 | 33.0 | 6.4 | Do. |
| 11[1] | 205–136 | 5.8 | 7.0 | 2.1 | 33.0 | 7.5 | Evidence of bed wetting at 144° C.; total wetting at 139° C. |
| 12 | 174–141 | 5.0 | 7.0 | 2.1 | 39.0 | 2.5 | Evidence of bed wetting at 141° C.; operation not smooth at 144° C. |
| 13 | Operating difficulties. | | | | | | |
| 14 | 179–142 | 4.5 | 6.7 | 2.1 | 18.0 | N.D. | Total wetting at 142° C.; dry bed not achieved thereafter. |
| 15 | Operating difficulties. | | | | | | |
| 16 | 193–150 | 5.0 | 10.0 | 2.1 | 18.0 | N.D. | Bed wet at 140° C. |
| 17 | 199–166 | 5.8 | 10.0 | 2.1 | 19.0 | 24.9 | Difficulties with air nozzle at 160° C.; no indications of wetting. |
| 18 | 173–151 | 6.0 | 10.0 | 2.1 | 37.0 | 4.7 | No indication of wetting. |
| 19 | 171–138 | 4.5 | 10.0 | 2.3 | 38.0 | 5.7 | Air nozzle plugging at 154° C.; evidence of bed wetting at 148° C. |
| 20 | 196–151 | 5.5 | 10.0 | 2.8 | 85.0 | 16.4 | Evidence of bed wetting at 157° C. |

[1] Liquid feed: 3.5% NaCl solution.
[2] Air was fluidizing gas.

156° F.; and the steam from the fourth bed would be about 120° F. The last reactor may have to be operated at reduced pressure to improve evaporation rates and prevent bed wetting. The amount of fresh water produced from the heat exchangers would be about 0.31 m.g.p.d. from the second exchanger, about 0.29 m.g.p.d. from the third exchanger and about 0.26 m.g.p.d. from the fourth exchanger. An additional 0.24 m.g.p.d. would be evaporated from the fourth bed.

It should be clear that the given values depend upon the desired plant capacity, the type of heating medium available and other physical considerations. The invention is not limited to the use of four reactors or to the use of any particular heating medium.

It will be understood that the invention is not to be limited to the details given herein but that it may be modified wihin the scope of the appended claims.

The embodiments of the invention in which an exclusive property or privilege is claimed are defined as follows:

1. A method for the desalination of sea water comprising spraying atomized sea water into a heated fluidized bed, whereby fresh water evaporates from the bed and salt is produced and remains in the bed and removing the fresh water as vapor from the bed situs; said fluidized bed consisting essentially of salt particles which are fluidized by passing steam upwardly therethrough; said sea water being atomized with separate steam.

2. A method of producing desalted water and salt from sea water comprising:

establishing and maintaining a series of fluidized beds consisting essentially of salt particles by passing steam upward therethrough;

heating said bed by a heater disposed in the bed to between about 145° C. and about 200° C.;

spraying sea water which has been atomized with separate steam into said heated bed whereby said bed is slightly wetted with said sea water before the desalted water evaporates from the bed and salt is produced and remains in said bed;

removing the desalted water vapor from the bed;

and separating the salt formed from the fluidized bed.

3. The method of claim 2 wherein the desalted water evaporates from the beds as steam and further comprising the step of heating the first bed in said series from an independent source and heating each bed thereafter by passing steam from the preceding bed in heat-exchange relation thereto.

References Cited

UNITED STATES PATENTS

| | | | |
|---|---|---|---|
| 2,561,394 | 7/1951 | Marshall | 117—100 |
| 2,579,944 | 12/1951 | Marshall | 117—100 |
| 2,635,684 | 4/1953 | Joscelyne | 159—48 |
| 3,152,005 | 10/1964 | Tuttle | 117—100 |
| 3,266,556 | 8/1966 | Malek | 159—16 |
| 3,402,753 | 9/1968 | Thomas | 159—47 |

NORMAN YUDKOFF, Primary Examiner

J. SOFER, Assistant Examiner

U.S. Cl. X.R.

159—16